(12) United States Patent
Biquez et al.

(10) Patent No.: US 10,643,764 B2
(45) Date of Patent: May 5, 2020

(54) GAS-INSULATED ELECTRICAL APPARATUS FILLED WITH A DIELECTRIC GAS

(71) Applicant: General Electric Technology GmbH, Baden (CH)

(72) Inventors: François Biquez, Pugny-Chatenod (FR); Yannick Kieffel, Saint-Jean-de-Bournay (FR); Sébastien Silvant, Lyons (FR)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 15/580,981

(22) PCT Filed: Jun. 7, 2016

(86) PCT No.: PCT/EP2016/062879
§ 371 (c)(1),
(2) Date: Dec. 8, 2017

(87) PCT Pub. No.: WO2016/198390
PCT Pub. Date: Dec. 15, 2016

(65) Prior Publication Data
US 2018/0197656 A1    Jul. 12, 2018

(30) Foreign Application Priority Data

Jun. 10, 2015  (EP) .................................... 15171516

(51) Int. Cl.
*H02B 13/00* (2006.01)
*H01B 3/56* (2006.01)
(Continued)

(52) U.S. Cl.
CPC ............... *H01B 3/56* (2013.01); *H01H 33/22* (2013.01); *H01H 33/982* (2013.01);
(Continued)

(58) Field of Classification Search
None
See application file for complete search history.

(56) References Cited

U.S. PATENT DOCUMENTS

| | | |
|---|---|---|
| 3,110,791 A | 11/1963 | Aspey et al. |
| 3,947,649 A | 3/1976 | Hertz |

(Continued)

FOREIGN PATENT DOCUMENTS

| | | |
|---|---|---|
| FR | 1 456 584 A1 | 7/1966 |
| FR | 2 459 543 A1 | 1/1981 |

(Continued)

OTHER PUBLICATIONS

Search Report issued in European Patent Application No. 15171516 dated Dec. 1, 2015.

(Continued)

*Primary Examiner* — Courtney L Smith
(74) *Attorney, Agent, or Firm* — Eversheds Sutherland (US) LLP

(57) ABSTRACT

The invention relates to medium- or high-voltage, gas-insulated electrical apparatus (10) comprising: a hermetically sealed chamber (12) filled with a dielectric gas, the gas containing at least one of fluoronitrile, carbon dioxide, dinitrogen or dioxygen; at least two electrical contacts (16, 20) arranged coaxially with a main axis (A) of the chamber (12), of which at least one (20) can move axially inside the chamber (12) between a closed position in which the two contacts (16, 20) are in electrical contact with one another and an open position in which the contacts (16, 20) are located at a distance from one another; and a cut-off mechanism (14) for extinguishing the electric arc that forms between the two contacts (16, 20) as the at least one moving contact (20) moves from the closed position into the open position. The cut-off mechanism is of the rotating arc type.

5 Claims, 1 Drawing Sheet

(51) Int. Cl.
*H01H 33/22* (2006.01)
*H01H 33/98* (2006.01)
*H02B 13/055* (2006.01)
*H01H 33/56* (2006.01)

(52) U.S. Cl.
CPC .......... *H02B 13/00* (2013.01); *H02B 13/055* (2013.01); *H01H 2033/566* (2013.01)

(56) References Cited

U.S. PATENT DOCUMENTS

| | | | | |
|---|---|---|---|---|
| 4,052,576 | A * | 10/1977 | Smith | H01H 33/18 218/29 |
| 4,196,327 | A * | 4/1980 | Kurosawa | H01H 33/6644 218/129 |
| 4,742,323 | A * | 5/1988 | Oakes | H01H 85/047 337/158 |
| 5,057,655 | A * | 10/1991 | Kersusan | H01H 33/7046 218/23 |
| 5,166,483 | A * | 11/1992 | Kersusan | H01H 33/982 218/71 |
| 5,519,370 | A * | 5/1996 | Perreira | H01H 3/001 218/123 |
| 2010/0038222 | A1 * | 2/2010 | Lindsey | H01H 9/0016 200/11 TC |
| 2013/0120879 | A1 * | 5/2013 | Shea | H01T 2/02 361/13 |
| 2015/0083979 | A1 * | 3/2015 | Costello | H01B 3/24 252/571 |
| 2015/0228375 | A1 | 8/2015 | Kieffel | |
| 2016/0241004 | A1 * | 8/2016 | Kieffel | H01B 3/56 |
| 2017/0162349 | A1 | 6/2017 | Girodet | |

FOREIGN PATENT DOCUMENTS

| | | |
|---|---|---|
| FR | 2 542 918 A1 | 9/1984 |
| FR | 2 752 329 A1 | 2/1998 |
| FR | 2 995 131 A1 | 3/2014 |
| FR | 3 011 138 A1 | 3/2015 |

OTHER PUBLICATIONS

International Search Report issued in Application No. PCT/EP2016/062879 dated Jul. 13, 2016.
Written Opinion issued in Application No. PCT/EP2016/062879 dated Jul. 13, 2016.
U.S. Appl. No. 15/550,599, "Gas-Insulated Medium- or High-Voltage Electrical Apparatus Including Heptafluoroisobutyronitrile and Tetrafluoromethane" filed Aug. 11, 2017.

* cited by examiner

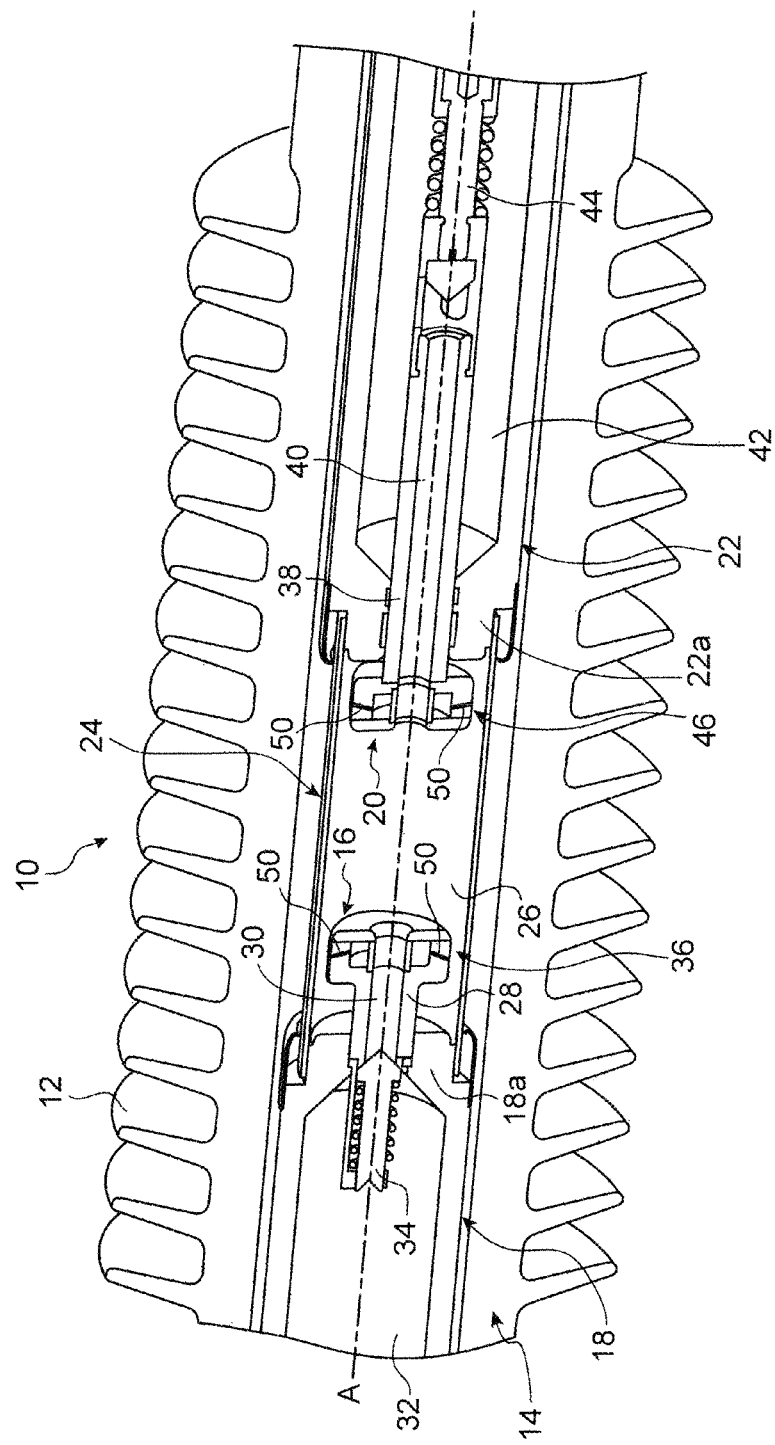

GAS-INSULATED ELECTRICAL APPARATUS FILLED WITH A DIELECTRIC GAS

TECHNICAL FIELD

The invention relates to switchgear such as a circuit breaker for a medium-, high-, or very high-voltage transmission line, using a dielectric gas that presents little or no environmental risk.

The dielectric gas, which replaces sulfur hexafluoride ($SF_6$), presents behavior that is different to that of sulfur hexafluoride, in particular with regard to the gas flow. That means the switchgear needs to be adapted to accommodate the gas used.

State of the Prior Art

Sulfur hexafluoride ($SF_6$) is a gas that has been used for a long time in switchgear, due to its electrical insulation and arc-control properties.

However, in the event of it being released into the air, that chemical presents an ecological risk, since it is a potent greenhouse gas.

As a substitute for such a chemical, proposals have been made to use a gas mixture including at least one of the following gases: fluoronitriles, carbon dioxide ($CO_2$), oxygen ($O_2$), or nitrogen ($N_2$).

Documents FR 3 011 138 and FR 1 456 584 describe the use of fluoronitriles in circuit breakers with arc blasting.

In a circuit breaker of the arc blasting type, the gas mixture is compressed during opening of the circuit breaker and is blasted at the electric arc that forms between the two electrical contacts of the circuit breaker in order to interrupt the current when it crosses zero.

The structure of the circuit breaker that is associated with such a gas mixture is modified relative to a circuit breaker associated with a mixture containing $SF_6$. Those modifications in the structure of the circuit breaker relate in particular to the blast nozzle and they have the consequence of the nozzle being worn quickly, so the circuit breaker therefore suffers a loss of performance.

The object of the invention is to propose switchgear for which the use of a dielectric gas mixture not containing sulfur hexafluoride ($SF_6$) does not lead to the arc-control means suffering loss of performance.

SUMMARY OF THE INVENTION

The invention provides medium- or high-voltage gas-insulated switchgear comprising:
- a hermetically sealed enclosure that is filled with a dielectric gas, said gas comprising at least one of fluoronitrile, carbon dioxide, nitrogen, or oxygen;
- at least two electrical contacts that are arranged coaxially about a main axis of the enclosure, at least one of which contacts is movable axially in the enclosure between a closed position in which the two contacts are in electrical contact with each other and an open position in which the contacts are spaced apart from each other; and
- an arc-control mechanism for extinguishing an electric arc that forms between the two contacts during a movement of said at least one movable contact from the closed position towards the open position;

the switchgear being characterized in that the arc-control mechanism is of the rotary arc type.

Extinguishing the electric arc using the rotary arc principle has the advantage of being independent of the flow of the insulating mixture for currents that are low, extending up to approximately 10% of the breaking capacity. Indeed, it is the rotation of the arc, under the effect of the magnetic field produced by the arc-control mechanism, that causes the arc to cool and then to be extinguished. For higher currents, i.e. greater than 10% of the breaking capacity, extinguishing the arc by rotation is supplemented by the flow of a stream of gas under pressure.

However, in such an embodiment, the surfaces of the components defining the passages for the dielectric gas are not worn by the successive arc-control cycles, unlike a prior art self-blast device for blasting the electric arc.

Preferably, the volume proportion of fluoronitrile in the total mixture lies in the range 0% to 20%.

Preferably, the fluoronitrile is heptafluoroisobutyronitrile.

Preferably, the volume proportion of oxygen ($O_2$) may lie in the range 0% to 25%.

Preferably, the volume proportion of carbon dioxide ($CO_2$) or of nitrogen ($N_2$) in the total mixture is defined in order to provide the balance of filling.

Preferably, the volume proportion of carbon dioxide ($CO_2$) or of nitrogen ($N_2$) in the total mixture is 55% to 100% of the total pressure of the mixture.

BRIEF DESCRIPTION OF THE DRAWING

Other characteristics and advantages of the invention appear on reading the following detailed description, which can be better understood on referring to the sole FIGURE, which is a diagrammatic axial section view of switchgear of the invention.

DETAILED DESCRIPTION OF PARTICULAR EMBODIMENTS

The sole FIGURE shows a gas-insulated circuit breaker that includes an enclosure 12 in which an arc-control mechanism 14 is housed.

The enclosure 12 is a body of revolution centered on its main axis A and defines a cylindrical internal volume centered on main axis A.

The arc-control mechanism 14 comprises a stationary arcing contact 16 mounted on an end or on a wall 18a of a stationary contact carrier 18 and a movable arcing contact 20 mounted on an end or on a wall 22a of a movable contact carrier 22.

The stationary contact carrier 18 and the movable contact carrier 22 have respective outside surfaces each having a portion that is of cylindrical shape, which portion is coaxial with and complementary to the inside volume of the enclosure 12.

In a variant embodiment, in addition to the arcing contacts 16, 20 shown, the arc-control mechanism includes two permanent contacts that are electrically connected to each other when the arc-control mechanism 14 is in the closed position and that are separated from each other before separation of the arcing contacts 16, 20, so that the electric arc is not formed between the permanent contacts.

In yet another variant embodiment, the arc-control mechanism further comprises a third contact.

This third contact acts as a permanent contact and introduces additional switching during a stage of opening the arc-control mechanism, by changing the tracking of the electric current.

Thus, initially, the electric current first flows directly from the permanent contact towards the opposite contact then, subsequently, the electrical current flows from the arcing contact towards the opposite contact.

The arc-control mechanism 14 further comprises a tube 24 made of insulating material, which tube is connected to the walls 18a, 22a of the stationary contact carrier 18 and of the movable contact carrier 22.

The insulating tube 24 is on the same axis as the main axis A of the circuit breaker 10 and it is connected in a gastight manner to each contact carrier 18, 22.

By way of example, the insulating tube 24 is made of a material selected from the following materials: PPS (polyphenylene sulfide), PEEK (polyetheretherketone), PTFE (polytetrafluoroethylene), glass-ceramic (Macor®), or agglomerated mica (mica or muscovite mica or phlogopite mica). In a non-limiting variant, PPS or PEEK may also be filled, e.g. with mica.

Together with the contact 18, 22, the tube 24 defines an auto-expansion chamber 26, also called the thermal volume, in which the arcing contacts 16, 20 are housed facing each other.

In a variant embodiment, the auto-expansion chamber 26 is open radially, via communication holes (not shown) formed by way of a non-limiting example in the stationary contact carrier 18 and/or in the movable contact carrier 22.

The stationary arcing contact 16 comprises a tubular body 28 that is on the same axis as the main axis A of the enclosure 12 and that defines an axial channel 30 connecting the auto-expansion chamber 26 to a discharge chamber 32 defined by a portion of the stationary contact carrier 18.

In a variant, the stationary arcing contact 16 may include a valve 34 for preventing the gas present in the discharge chamber 32 from re-entering the auto-expansion chamber 26.

The stationary arcing contact 16 also comprises an annular-shaped head 36 facing the movable arcing contact 20 that is of an outside diameter that is greater than the diameter of the body 28. The central orifice of the head 36 is of the same diameter as the axial channel 30 of the body 28.

It should be understood that the invention is not limited to this embodiment and that the outside diameter of the annular head 36 may be identical to or less than the diameter of body 28. The central orifice of the head 36 would then be less than the diameter of the axial channel 30 of the body 28.

The stationary arcing contact 20 also comprises a tubular body 38 that is on the same axis as the main axis A of the enclosure 12 and that defines an axial channel 40 connecting the auto-expansion chamber 26 to a second discharge chamber 42 defined by a portion of the stationary contact carrier 22. In a variant, the stationary arcing contact 16 may also include a valve 44 for preventing the gas present in the discharge chamber 42 from re-entering the auto-expansion chamber 26.

The movable arcing contact 20 also includes an annular-shaped head 46 facing the movable arcing contact 20 that is of an outside diameter that is greater than the diameter of the body 38. The central orifice of the head 46 is of the same diameter as the axial channel 40 of the body 38.

It should be understood that the invention is not limited to this embodiment and that the outside diameter of the head 46 may be identical to or less than the diameter of body 38. The central orifice of the head 46 would then be less than the diameter of the axial channel 40 of the body 38.

The head 36, 46 of each contact 16, 20 includes one or more slots 50.

Preferably, each slot 50 is inclined relative to the axis A of the device. Preferably, each slot 50 is thus directed in order to force the current to pass in a direction that is not axial, in this example, slightly at an angle from the facing overlay end faces of the contacts 16, 20, and outwards.

The positioning of these slots 50 is such that, on the arc-control mechanism 14 opening, the current passing through the contacts 16, 20 generates a magnetic field having a radial component. This magnetic field generates a circumferential force on the electric arc, which also forms between the facing faces of the two contacts 16, 20.

The electric arc is then forced to turn about a main axis A of the device, which contributes to it being blasted.

It should be understood that the invention is not limited to this embodiment of the means for generating a magnetic field.

By way of a non-limiting example, one and/or the other of the heads 36, 46 includes a Bitter coil in order to generate the magnetic field.

The inside volumes of the enclosure 12, the auto-expansion chamber 26 and the discharge chambers 32, 42, are filled with a dielectric gas ensuring electrical insulation when the contacts 16 and 20 are in the fully open position, corresponding to the open position of the circuit breaker.

This dielectric gas also makes it possible to facilitate electric arc blasting when, because of the heat of the electric arc, the gas present in the auto-expansion chamber 26 expands and then escapes towards the discharge chambers 32, 42, blasting the electric arc and passing through the communication holes, if necessary.

This dielectric gas consists of a mixture of a plurality of gases including fluoronitrile, such as for example heptafluoroisobutyronitrile, carbon dioxide, nitrogen, or oxygen.

The proportion of heptafluoroisobutyronitrile in the mixture is determined by the minimum operating temperature of the switchgear 10, and also as a function of the desired filling pressure. This proportion is thus determined in such a manner that the partial pressure of the heptafluoroisobutyronitrile is lower than its saturated vapor pressure at the minimum utilization temperature of the equipment. Typically, the proportion of heptafluoroisobutyronitrile in the total mixture lies in the range 0 volume percent (vol %) and 20 vol %.

The proportion of oxygen ($O_2$) may lie in the range 0% to 25%.

The proportion of carbon dioxide ($CO_2$) or nitrogen ($N_2$) provides the balance of the filling; it may be 55% to 100% of the total pressure of the mixture.

When using the switchgear 10 for interrupting high currents, the arc is blasted with the gas mixture in addition to arc extinction using a rotary arc.

To do this, the sections of the through orifices through which gas passes are of relatively small dimensions, in order to be appropriate for the behavior of the heptafluoroisobutyronitrile, $CO_2$, $O_2$, and $N_2$ mixture.

Over the lifetime of the switchgear, successive interruption operations and electric wear do not lead to any variation of the flow sections, thus making it possible to guarantee that the performance of the switchgear is stable over time, for interrupting higher currents.

In addition, the use of such a gas mixture with a rotary arc interrupter device 14 makes it possible for the flow sections to be smaller than in a device designed for a dielectric gas based on sulfur hexafluoride.

In particular, that makes it possible to have an arc-control mechanism 14 that is more compact, thus limiting manufacturing costs.

What is claimed is:

1. A medium- or high-voltage gas-insulated switchgear comprising:

a hermetically sealed enclosure that is filled with a dielectric gas, said gas comprising fluoronitrile, wherein a volume proportion of the fluoronitrile is less than or equal to 20%;

a first electrical contact and a second electrical contact, the first electrical contact and the second electrical contact being arranged coaxially about a main axis of the enclosure, wherein the first electrical contact comprises a contact head including a first slot configured at an incline relative to the main axis of the enclosure, wherein the first electrical contact is movable axially in the enclosure between a closed position in which the first electrical contact and second electrical contact are in electrical contact with each other and an open position in which the first electrical contact and second electrical contact are spaced apart from each other, wherein the first slot causes current passing through the first electrical contact to have a magnetic field with a radial component, wherein the radial component of the magnetic field causes a rotation of an electrical arc about the main axis in the enclosure, and wherein the electrical arc, based on the rotation about the main axis, cools and extinguishes.

2. The switchgear according to claim 1, wherein the fluoronitrile is heptafluoro-iso-butyronitrile.

3. The switchgear according to claim 1, wherein the dielectric gas comprises oxygen ($O_2$), wherein a volume proportion of oxygen ($O_2$) is less than or equal to 25%.

4. The switchgear according to claim 1, wherein the dielectric gas comprises carbon dioxide ($CO_2$) or nitrogen ($N_2$) and in that a volume proportion of carbon dioxide ($CO_2$) or of nitrogen ($N_2$) in the gas is defined in order to provide a balance of filling.

5. The switchgear according to claim 1, wherein a volume proportion of carbon dioxide ($CO_2$) or of nitrogen ($N_2$) the gas can vary between 55% to 100%.

* * * * *